US008030595B2

(12) United States Patent
Nakamura

(10) Patent No.: US 8,030,595 B2
(45) Date of Patent: Oct. 4, 2011

(54) DISPLAY METHOD FOR LASER IRRADIATIONS STATE AND DISPLAY SYSTEM OF LASER IRRADIATION STATE

(75) Inventor: Takamasa Nakamura, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1195 days.

(21) Appl. No.: 11/526,867

(22) Filed: Sep. 26, 2006

(65) Prior Publication Data

US 2007/0075054 A1    Apr. 5, 2007

(30) Foreign Application Priority Data

Sep. 30, 2005   (JP) .................................. 2005-289180

(51) Int. Cl.
*B23K 26/02* (2006.01)
(52) U.S. Cl. .......... 219/121.83; 219/121.63; 219/121.74
(58) Field of Classification Search ............... 359/202.1, 359/203.1; 901/41, 42; 219/121.83, 121.64, 219/121.74, 121.79, 121.8, 121.81, 121.63; 356/394
See application file for complete search history.

(56) References Cited

U.S. PATENT DOCUMENTS

| | | | | |
|---|---|---|---|---|
| 4,908,493 A * | 3/1990 | Susemihl | .................. | 219/121.67 |
| 5,582,750 A | 12/1996 | Hamura et al. | | |
| 5,615,013 A * | 3/1997 | Rueb et al. | ..................... | 356/394 |
| 5,624,585 A * | 4/1997 | Haruta et al. | ............. | 219/121.63 |
| 5,670,068 A * | 9/1997 | Kuriyama et al. | ........ | 219/121.83 |
| 6,091,749 A * | 7/2000 | Hoffmaster et al. | ........ | 372/38.02 |
| 6,657,156 B2 * | 12/2003 | Kubota et al. | ............. | 219/121.63 |
| 7,557,326 B2 * | 7/2009 | Boillot et al. | ............. | 219/121.63 |
| 2005/0150876 A1 | 7/2005 | Menin et al. | | |
| 2005/0163174 A1* | 7/2005 | Nakayama et al. | ............. | 372/22 |
| 2005/0281101 A1* | 12/2005 | Bruland et al. | ............... | 365/200 |
| 2006/0175301 A1 | 8/2006 | Rippl | | |
| 2007/0147752 A1* | 6/2007 | Weisberg et al. | ............. | 385/123 |

FOREIGN PATENT DOCUMENTS

| | | |
|---|---|---|
| DE | 103 35 501 A1 | 2/2004 |
| DE | 103 33 456 A1 | 2/2005 |
| DE | 10 2004 043 076 A1 | 4/2005 |
| JP | 03-031079 | 3/1991 |
| JP | 03-297590 | 12/1991 |
| JP | 8-243773 A * | 9/1996 |
| JP | 9-141458 A * | 6/1997 |
| JP | 2000-263272 A * | 9/2000 |
| JP | 2000-326082 A * | 11/2000 |
| JP | 2001-340979 | 12/2001 |

(Continued)

OTHER PUBLICATIONS

Machine translation of Japan Patent No. 8-243,773, Nov. 2009.*

(Continued)

*Primary Examiner* — Geoffrey S Evans
(74) *Attorney, Agent, or Firm* — Foley & Lardner LLP

(57) ABSTRACT

A method for displaying laser irradiation state and a system of displaying laser irradiation state, enabling to monitor laser irradiation state correctly and rapidly even when a laser irradiation direction varies, and a scanner head and a work are relatively apart, characterized that laser light is irradiated at the surface of a work, in a specified pattern shape different from a process pattern from a scanner head, in advance of process by irradiation of laser light at a work by a scanner head mounted at a robot hand.

7 Claims, 6 Drawing Sheets

FOREIGN PATENT DOCUMENTS

| | | |
|---|---|---|
| JP | 2004-98163 A | 4/2004 |
| JP | 2004-130334 A | 4/2004 |

OTHER PUBLICATIONS

Machine translation of Japan Patent No. 9-141,458, Nov. 2009.*

Machine translation of Japan Patent document No. 2000-326,082, Jun. 2010.*

Notification of Reason for Refusal (Translation) in JP Appln. No. 2005-289180 dated Nov. 30, 2010.

Official Notice of Reasons for Refusal in JP Appln No: 2005-289180 dated Jun. 21, 2011.

* cited by examiner

DISPLAY METHOD FOR LASER IRRADIATIONS STATE AND DISPLAY SYSTEM OF LASER IRRADIATION STATE

BACKGROUND OF THE INVENTION

1. Field of the Invention

The present invention relates to a display method for laser irradiation state and a display system of laser irradiation state and in particular, relates to technology suitable to carry out teaching operation and the like, in advance of process of welding and the like, to a work.

2. Description of the Related Art

Recently, laser welding has been used also in welding utilizing a robot. As such welding technology, there has conventionally been such technology as carrying out welding rapidly with high degree of freedom in an irradiation direction, by means of stopping a laser irradiation part attached at the tip of a robot handle, apart from a welding point while varying the laser irradiation direction by means of rotating a reflecting mirror inside the laser irradiation part, to carry out welding by irradiation of laser light at a work.

To obtain high welding quality in such laser welding, alignment of a laser irradiation part at a specified position is required so that laser focuses at a welding point of the work surface, as well as laser is correctly irradiated at the welding point. As a result of such alignment, action of the robot is set in advance by CAD simulation so that the laser irradiation part is aligned at the specified position usually in welding.

However, disjunction may generate between action of a robot predicted by a simulation and a real action of a robot, due to error of inertial force and weight, and the like, of a robot. Generation of this disjunction may result in non-alignment of the laser irradiation part at an adequate position, irradiation of laser at a point other than a welding point, or non-focusing of laser at a welding point, which leads to lowering of welding quality. To avoid such troubles, confirmation of practical laser irradiation state is required in teaching operation of movement of a robot in advance.

JP-A-2004-130334 has disclosed technology enabling to confirm practical laser irradiation state in teaching a position of laser irradiation state. In this technology, a contact type displacement gauge is installed, which is protruded from the tip of a laser irradiation part by length equivalent to focal distance of laser in a laser irradiation direction. Then, by contact of the contact type displacement gauge with a welding point of a work, information on a position of the laser irradiation part (that is, a position of the laser irradiation part in the state of laser focusing at a welding point) is obtained, and based on the information, a position of the laser irradiation part is adjusted to enable focusing of laser at a welding point.

However, although the conventional technology is applicable to the case when a laser irradiation direction is constant and distance between the position of laser irradiation and a work is close, in the case when a laser irradiation direction is required to be varied, angle thereof cannot correctly be monitored, and also in the case when distance between the position of laser irradiation and a work is apart, generation of bending of the contact type displacement gauge makes correct measurement impossible, and workability becomes poor because contact of the displacement gauge with a work is required always.

SUMMARY OF THE INVENTION

The present invention was made in view of the problems of the conventional technology, and aims at providing a display method for laser irradiation state and a display system of laser irradiation state to monitor laser irradiation state correctly and rapidly even in the case when a laser irradiation direction is required to be varied, and distance between the position of laser irradiation and a work is relatively apart.

The present invention aiming at solving the problems is a display method and a display system of laser irradiation state at the work, in advance of process by irradiation of laser light at the work from a laser irradiation part mounted at a robot hand, wherein laser light is irradiated by the laser irradiation part at the surface of the work in a specified pattern shape different from a process pattern.

In addition, the specified pattern shape to be irradiated is formed by operation of a reflecting mirror of the laser irradiation part, and further, the specified pattern preferably is circular-like or cross-like.

According to the present invention, laser light is irradiated at a work in advance of laser process by irradiation of laser light at a work from a laser irradiation part mounted at a robot hand, wherein laser light is irradiated by the laser irradiation part at the surface of the work in a specified pattern shape different from a process pattern. As a result of such irradiation, laser irradiation state, including irradiation angle, can be monitored correctly and rapidly, even when a laser irradiation direction is to be varied, or distance between the laser irradiation part and a work is far apart.

DETAILED DESCRIPTION OF THE PREFERRED EMBODIMENT

The embodiment of the present invention is now explained in detail by referring to drawings.

This embodiment explains the case of carrying out welding as process work by laser light.

Figure 1:
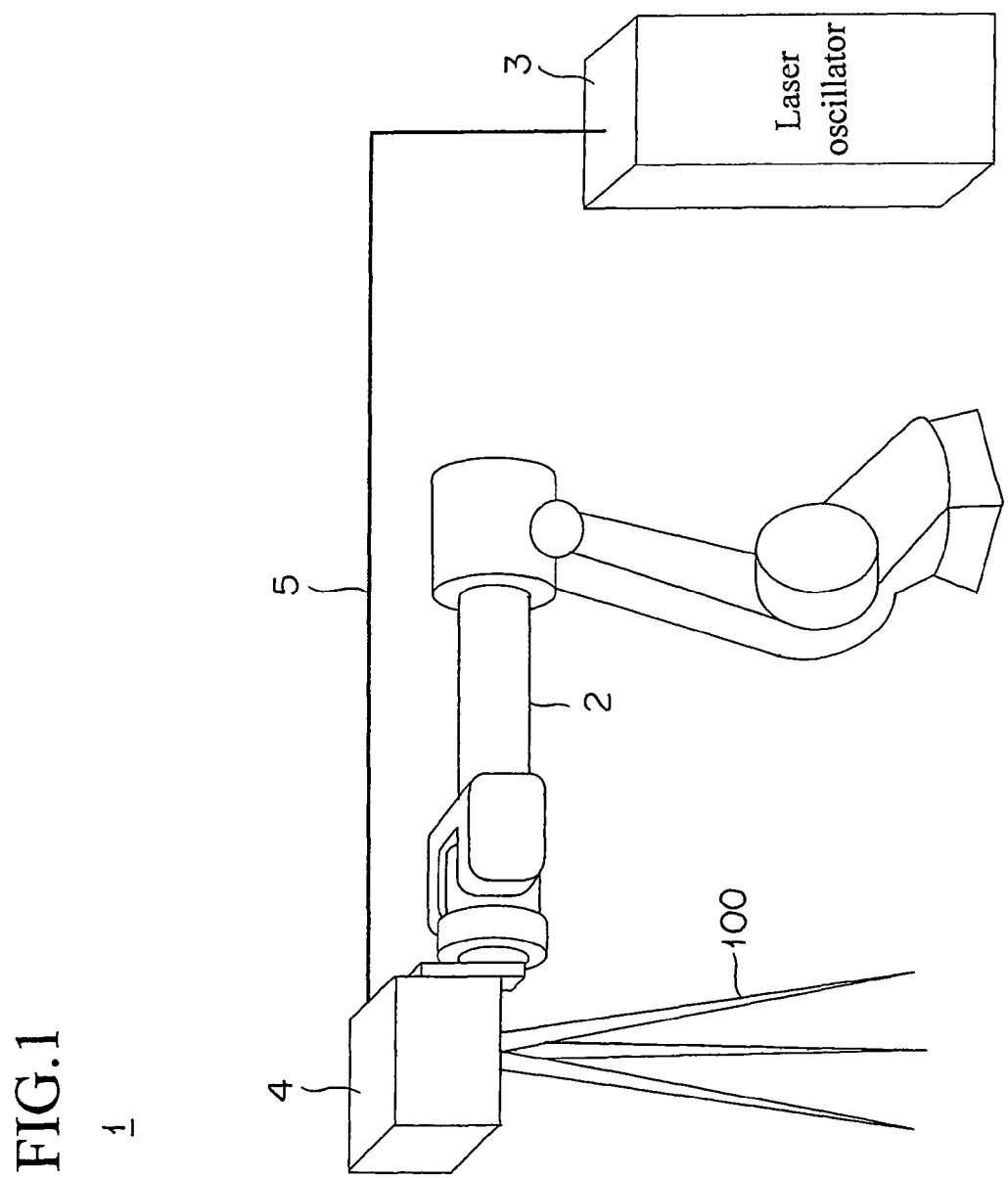
FIG. 1 is a schematic perspective view to explain laser welding equipment in an embodiment of the present invention.
Figure 2:
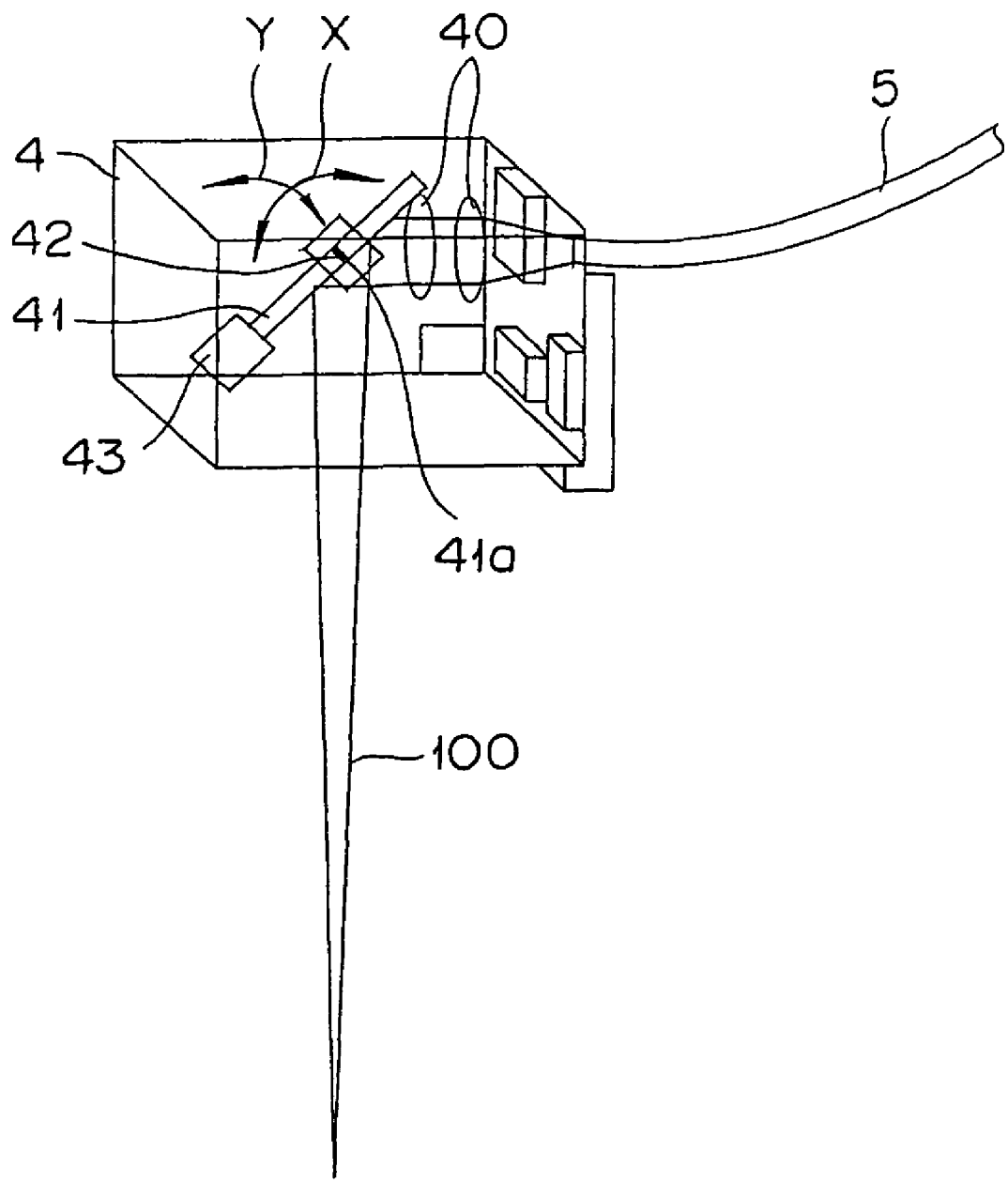
FIG. 2 is a schematic perspective view to explain a scanner head.
Figure 3:
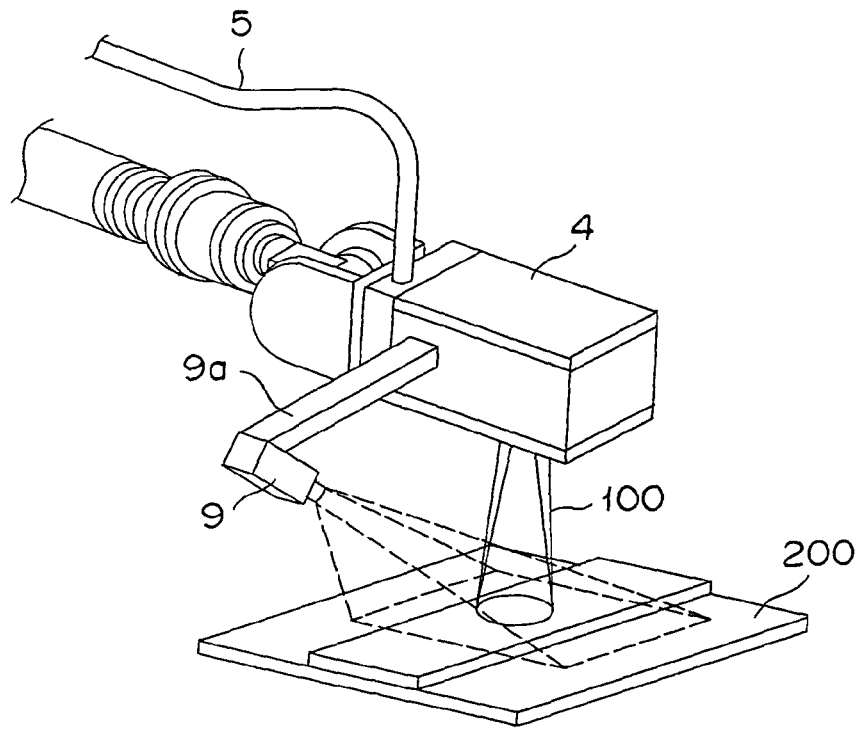
FIG. 3 is a partially magnified view of the peripheral of a scanner head.

FIG. 1 is a schematic perspective view to explain laser welding equipment 1 in the embodiment of the present invention, FIG. 2 is a schematic perspective view to explain a scanner head 4 and FIG. 3 is a partially magnified view of the peripheral of a scanner head 4.

Laser welding equipment 1, as is shown in FIG. 1, is composed of a robot 2, a laser oscillator 3 as laser light source, a scanner head 4 (a laser irradiation part) attached at the tip of a robot hand of a robot 2 for irradiation of laser light 100 toward a work 200, and an optical fiber cable 5 for introducing laser light 100 from a laser oscillator 3 to a scanner head 4.

A robot 2 is a general multi-axis robot (which may also be called a multi-joint robot), and the like, which enables to move a scanner head 4 attached at the tip of a robot hand to various positions by means of varying the position of a robot according to data of action routes given by teaching operation, as well as enables to vary a direction of a scanner head 4.

A laser oscillator 3 is a YAG laser oscillator. A YAG laser is used here to introduce laser light 100 by an optical fiber cable 5. In this connection, other type of laser is also applicable without limitation as long as it can be used in laser welding and can introduce laser light by an optical fiber cable 5.

A scanner head 4, as is shown in FIG. 2, has a series of lenses 40 for making laser light 100 irradiated from the end part of an optical fiber cable 5 to be parallel light, and further for focusing laser light 100 thus made to be parallel light at a specified position, and a reflecting mirror 41 for irradiation of laser light 100 passing through a series of lenses 40 toward a work 200 finally, and motor 42 and 43 for rotation of a reflecting mirror 41. In addition, as is shown in FIG. 3, a scanner head 4 is attached with a CCD camera 9 (an imaging part) for shooting the surface of a work 200 via a bracket 9a. In this connection, a work 200 and a scanner head 4 (a laser irradiation part) are present for carrying out welding operation in a relatively far apart space of about 30 cm to 1 m, and because a laser irradiation direction is varied by rotation of a reflecting mirror 41 of a scanner head 4 while moving a robot 2, welding operation can be carried out in more higher speed having degree of freedom in an irradiation direction.

A reflecting mirror 41 is installed in free rotation mode around each of an x axis and a y axis, both of which are orthogonal to a vertical axis passing the rotation center 41a of a reflecting mirror 41, and by such rotation, an irradiation direction of laser light 100 can freely be sorted. In this connection, motor 42 and 43 may optionally be equipped with gear mechanism (not shown). As these motor 42 and motor 43, for example, a servo motor, a stepping motor, and the like can be used, and such a motor is preferable as rotates in response to specified rotation angle.

Figure 4:
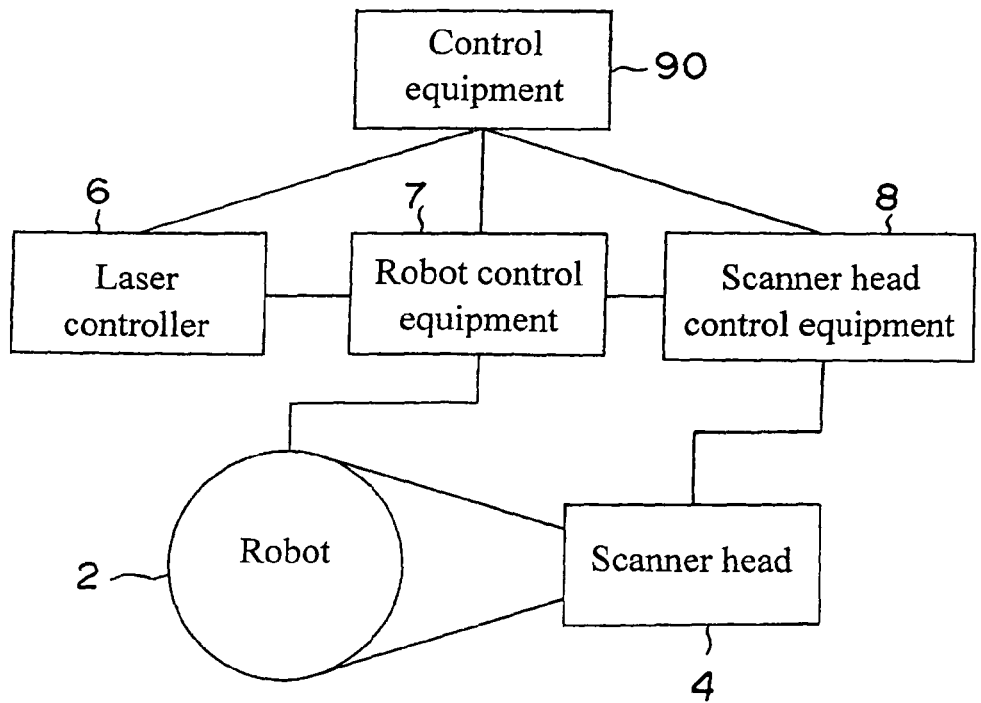
FIG. 4 is a block diagram to explain a display system of laser irradiation state in an embodiment of the present invention.

FIG. 4 is a block diagram to explain a display system of laser irradiation state in an embodiment of the present invention. FIG. 4 also functions as a control system in carrying out a practical laser welding system.

A control system of a laser welding system is composed of a laser controller 6 for on-off controlling of laser output in a laser oscillator 3, a robot control equipment 7 for controlling movement of a robot 2, scanner head control equipment 8 for controlling movement of a reflecting mirror 41 of a scanner head 4, and control equipment 90 for controlling equipment as a whole.

A laser controller 6 controls on-off of laser output and adjusts laser output intensity, and the like. This laser controller 6 provides on-off operation of laser output, based on control signals from robot control equipment 7.

Robot control equipment 7 has function of controlling movement (position) of a robot 2, as well as making output of control signals such as on-off of laser output.

Scanner head control equipment 8 arbitrarily varies an irradiation direction of laser light 100 by moving motor 42 and 43 of a reflecting mirror 41. In this connection, "To vary arbitrarily an irradiation direction" here specifically represents the movement to direct laser light 100 toward a welding point direction.

Control equipment 90 controls equipment as a whole, by monitoring laser welding equipment 1 plurally aligned in a production line, or by directing movement of a robot 2 after receiving operation completion signals of robots (nor shown) other than a robot 2, aligned in a production line, and the like, so that each robot takes a series of moves in good timing.

Now, action in a display system of laser irradiation state, having the composition above is explained.

In this connection, processing shown below is for the case of correct monitoring of 3D positional relation of a scanner head 4 and a work 200 in advance of carrying out welding, to teach movements of a robot 2 and a reflecting mirror 41 of a scanner head 4, so that laser light 100 is irradiated at a welding point of a work 200 in a correct direction and in correct focusing, and furthermore to teach focus adjustment, so that focusing is made on a welding point of a work 200 by varying distances of a series of lenses 40 by a motor not included in the Figure. On the focus adjustment, explanation was given for the case of teaching, so that distances of a series of lenses 40 are varied in advance, however, equipment for automatic adjustment of focus, by measurement of distance between a scanner head 4 and a work 200, may be installed, and in such a case, teaching of focus adjustment is not necessary, and detailed explanation on welding operation or teaching operation is omitted here.

Figure 5:
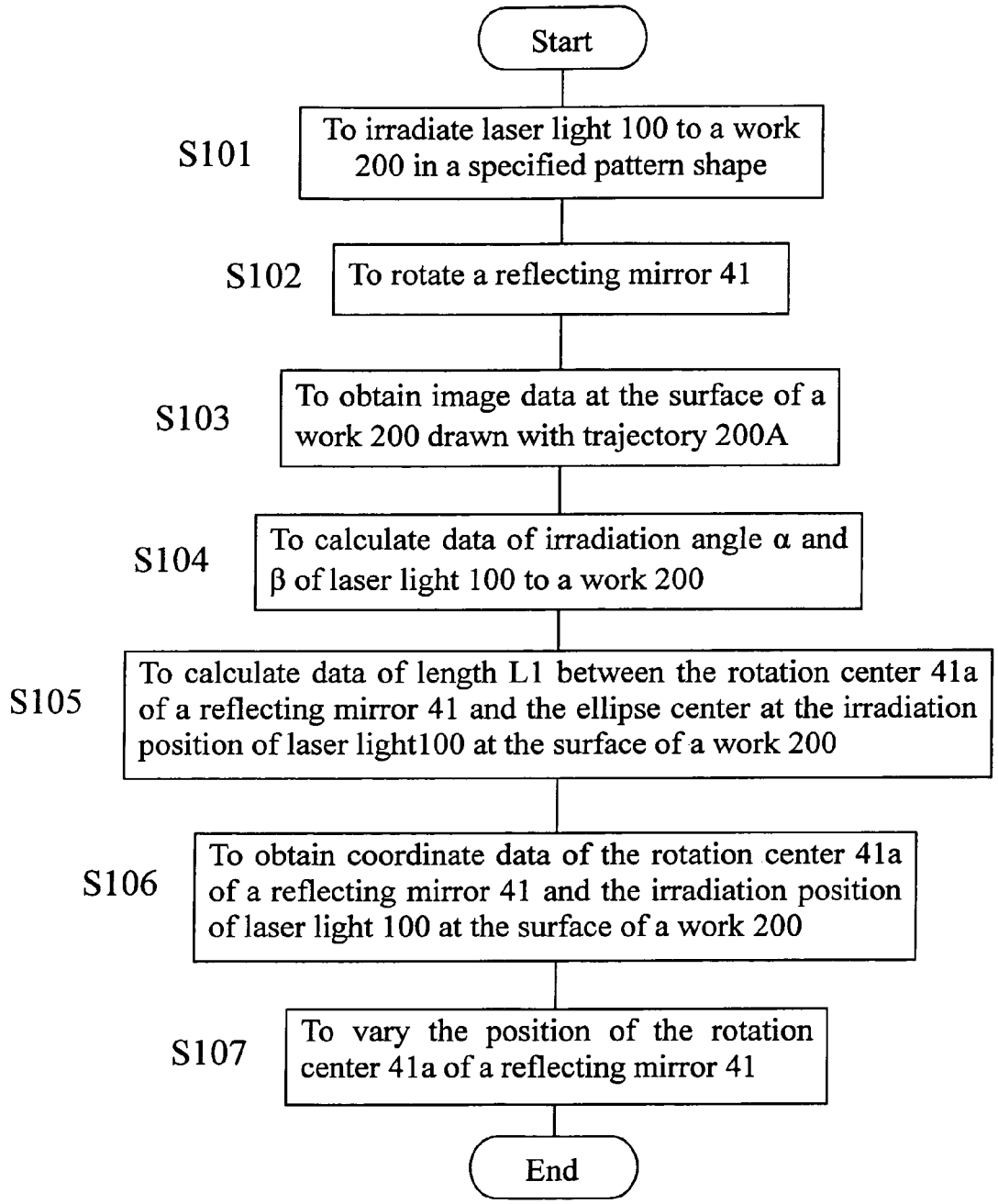
FIG. 5 is a flow chart of processing carried out in control equipment.

FIG. 5 is a flow chart of processing carried out in control equipment 90.

First of all, control equipment 90 switches laser output on, and directs scanner head control equipment 8 to irradiate laser light 100 at the surface of a work 200 in a specified pattern shape from a scanner head 5 (S101) During irradiation of this laser light 100, output level of laser light 100 is lowered than output level in welding operation (for example, about 1 to 5% in welding operation), so that laser is projected to a work 200 in non-welding state. By such irradiation in lowered level, burn mark is not left on a work 200 and reflecting light of laser can be confirmed by human visual observation. In this connection, the degree of level to be lowered may be varied depending on the kind of a work 200 (for example, characteristics such as gloss degree or melting point) to make laser light more clearer. In this connection, a robot 2 here is in an off-line state, and a scanner head 4 is moved to a position taught in advance.

Next, control equipment 90 directs scanner head control equipment 8 to rotate a reflecting mirror 41 so that an arbitrary point at the surface of a reflecting mirror 41. makes circular motion on a specified horizontal plane in a movement pattern taught in advance (S102).

Figure 6:
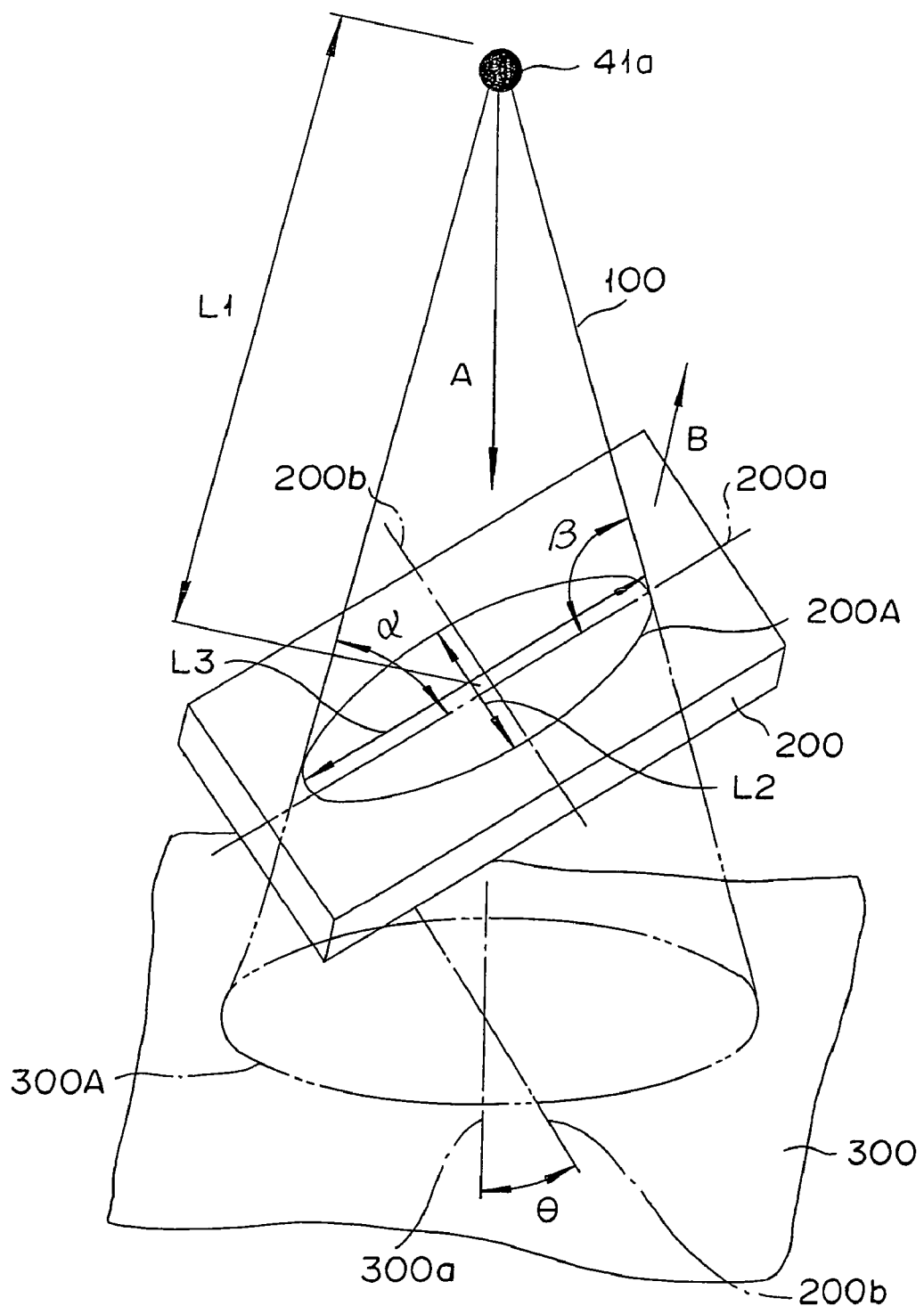
FIG. 6 is a drawing showing an example of work surface irradiated with laser light.

FIG. 6 shows an example of the surface of a work 200 irradiated with laser light 100 in this case.

FIG. 6 represents the case when a vertical line A drawn in a vertical direction from the rotation center 41a of a reflecting mirror 41 and a perpendicular line B against the surface of a work 200 are not in parallel.

In this FIG., "300" represents an arbitrary horizontal plane vertically positioned downward from a scanner head 4. A trajectory 300A, namely an irradiation pattern of laser light 100 irradiated at this horizontal plane, provides a circle, because a reflecting mirror 41 rotates as described above. On the contrary, a trajectory 200A, namely an irradiation pattern of laser light 100 irradiated onto the surface of a work 200, provides an ellipse, because a vertical line A and a perpendicular line B are not in parallel.

In such a state that laser light 100 is irradiated at a work 200, in the present embodiment, compensation processing is carried out so that the position of a rotation center 41a of a reflecting mirror 41 is varied for laser light 100 to correctly be irradiated at a welding point, as well as for laser light 100 to be focused at a welding point. This processing is described later. In this connection, in the present embodiment, such conditions that irradiation angles α and β of laser light 100 to a work 200 are equal and specified angle, as well as separated distance L1 between the rotation center 41*a* of a reflecting mirror 41 and a work 200 is equal to focal distance of laser light 100, provide state that laser light 100 is correctly irradiated at a welding point, as well as laser light 100 is focused at a welding point. In addition, such conditions that irradiation angles α and β are equal and specified angle make trajectory 200A to be circular.

Now back to FIG. 5, subsequent to a step S102, control equipment 90 directs a CCD camera 9 to shoot the surface of a work 200 irradiated with laser light 100 to get image data of the surface of a work 200 drawn with trajectory 200A (S103).

Figure 7:
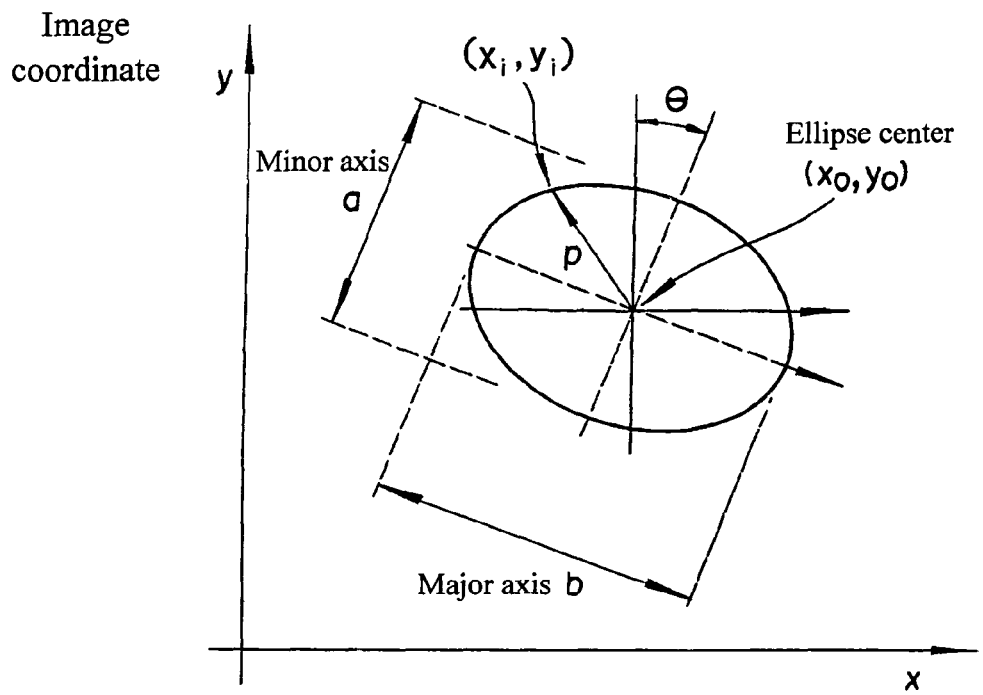
FIG. 7 is a drawing showing an example of a method for obtaining an elliptic orbit, namely an irradiation pattern of laser light, as image data.

Here, a method for obtaining trajectory 200A having ellipse shape, which is an irradiation pattern of laser light 100, as image data, is explained by FIG. 7.

First of all, trajectory drawn by laser is shot by a CCD camera 9 (an image shooting part) shown in .FIG. 3. In this connection, because a CCD camera 9 is not present on a light axis of a reflecting mirror 41 and shoots from a inclined direction, compensation is carried out in advance so that image is input as a true circle, when an irradiation pattern is a true circle, however, detailed explanation thereof is omitted here, because such image processing is general.

Because the resultant image has higher brightness only at a laser projection are a than the periphery thereof, the image extracted only laser trajectory can be obtained by first derivation and thinning processing of image, and the like, using an edge detection operator not shown (such as an SOBEL operator and a Prewitt operator), and the like.

Then, center of gravity of sequence of points (xi, yi) (i=1ton) of the resultant laser trajectory is determined by the following equations. This is coincident with the ellipse center (x0, y0) in FIG. 7.

$$x_0 = \sum_{i=1}^{n} x_i / n$$

$$y_0 = \sum_{i=1}^{n} y_i / n$$

Subsequently, distance pi (i=1 to n) between the resultant ellipse center (x0, y0) and sequence of points (xi, yi) (i=1 to n) of the laser trajectory is determined by the following equations. Each of a point (xi_max, yi_max) giving maximal value of pi, and a point (xi_min, yi_min) giving minimal value of pi is determined. Minor axis a and major axis b are represented as follows:

$$p_i = ((x_i - x_0)^2 + (y_i - y_0)^2)^{1/2}$$

$$a = 2 \times ((x_{i\_min} - x_0)^2 + (y_{i\_min} - y_0)^2)^{1/2}$$

$$b = 2 \times ((x_{i\_max} - x_0)^2 + (y_{i\_max} - y_0)^2)^2$$

Angle θ created by a linear line connecting the resultant ellipse center (x0, y0) and (xi_min, yi_min), and a y axis of an image coordinate can be determined by the following equations. In this connection, angle created by a linear line connecting the resultant ellipse center (x0, y0) and (xi_max, yi_max), and an x axis of an image coordinate may alternately be determined.

$$\theta = 90 - \tan^{-1} \frac{(y_{i\_min} - y_0)}{(x_{i\_min} - x_0)} \ [\text{deg}]$$

or $$\theta = \tan^{-1} \frac{(y_{i\_max} - y_0)}{(x_{i\_max} - x_0)} \ [\text{deg}]$$

In this connection, various methods have been proposed for determining parameters (center, major axis, minor axis, inclination) of an ellipse from the image, and many well-known methods are present such as fitting of an elliptic function based on a least squares method, and a method for using Hough transform, and these methods are also applicable similarly.

Next, control equipment 90 calculates data on irradiation angles α and β of laser light 100 to a work 200 shown in FIG. 6 (S104). Specifically, control equipment 90 calculates, based on image data obtained, angle θ created by crossing of an axis 200*b*', which is a minor axis 200*b* of trajectory 200A projected on a horizontal plane, and a specified axis 300*a* passing the center of trajectory 300A (an Y axis in FIG. 7), by a method explained using the FIG. 7.

Then, control equipment 90 calculates, based on image data obtained, data of distance L1 between the rotation center 41*a* of a reflecting mirror 41 and the ellipse center at the irradiation position of laser light 100 at the surface of a work 200 (S105). Specifically, because control equipment 90 can calculate, based on image data obtained, minor axis length L2 (a minor axis a in FIG. 7) and major axis length L3 (a major axis b in FIG. 7) of trajectory 200A, angle θ and the ellipse center, by the method explained using FIG. 7, by means of measurement, in advance, of diameter of a circle, when an irradiation pattern provides a true circle under such conditions that distance between a scanner head 4 and a work 200 is a specific value, and angle θ=0 (an irradiation direction is perpendicular to a work 200 plane), as a standard circle, coordinate data of the position of the rotation center 41*a* of a reflecting mirror 41 in three dimension and the irradiation position of laser light 100 to a work 200 can be calculated by comparison with this standard circle, using trigonometry (S106).

Then, control equipment 90 directs, based on coordinate data thus calculated, action of a robot 2 to vary the position of the rotation center 41*a* of a reflecting mirror 41 (namely, the position of a scanner head 4) so that angle θ becomes specified angle, and minor axis length L2 and major axis-length L3 become the same and specified length (S107). Specifically, control equipment 90 directs robot control equipment 7 to move a robot 2 as specified above. In addition, in the present embodiment, "the specified angle" represents angle created by crossing of an axis 200*b*' and an axis 300*a* in such state that a vertical line A and a perpendicular line B are in parallel, and "the specified length" represents diameter of trajectory 200A in such state that separated distance L1 becomes equal to focal distance of laser light 100.

Because irradiation angles α and β become the same and specified angle, as well as separated distance L1 becomes equal to focal distance of laser light 100 after execution of the above processing, laser light 100 is correctly irradiated at a welding point, as well as remote welding becomes possible, wherein laser light 100 focuses at a welding point.

In addition, in processing shown in FIG. 5, because laser light 100 is irradiated at a work 200 in such state that output level of laser light 100 is adjusted to be low so that it is projected in non-welding state to a work 200, there is no risk of burn mark generation at a work 200. By adopting such irradiation, a work 200 used in processing shown in FIG. 5 can be used as it is as a part substance to be welded.

The present invention is by no means limited to the above embodiments, and various modifications can be made within the scope of the claims.

For example, in the above Example, such a case is shown that by irradiation of laser light 100 at the surface of a work 200 in circle-like pattern shape from a scanner head 5 by means of a scanner head control equipment 8, the irradiation position and angle of laser light 100 at the surface of a work 200 can easily be determined, however, they can easily be determined by other method such as irradiation in cross-like pattern shape. Detailed explanation on this is omitted because it is a calculation method using trigonometry similarly as in the above Example.

Figure 8:
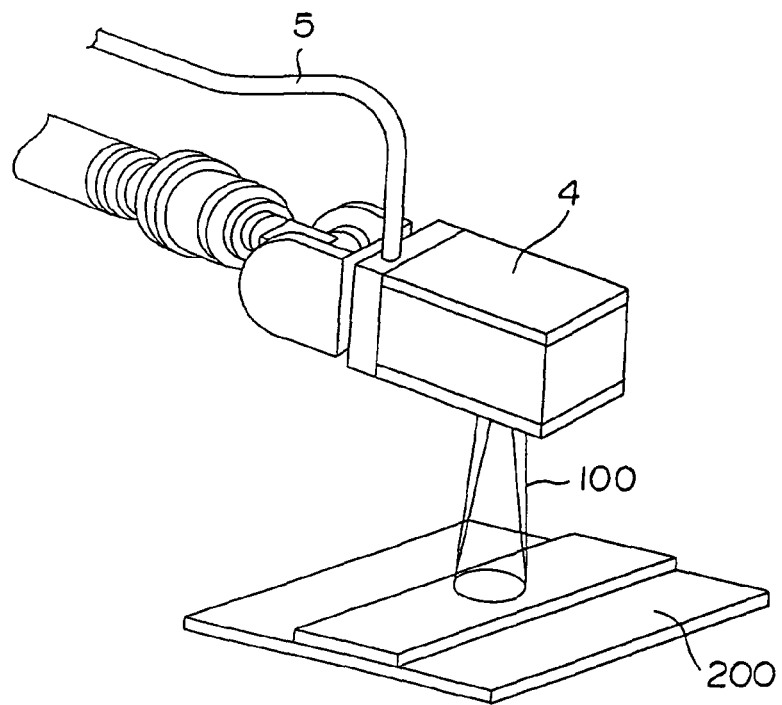
FIG. 8 is a partially magnified view of the peripheral of a scanner head in laser welding equipment of the present invention in FIG. 1 and other embodiments.

In addition, an exclusive computer may be installed to carry out processing in response to steps S 103 to 107 shown in FIG. 5. In this case, the computer, control equipment 90 and a camera 4a are connected via communication network, for example, LAN (Local Area Network), and the like. Then the computer calculates the angle θ, and minor axis length L2 and major axis length L3 of trajectory 200A, based on image data obtained at the surface of a work 200 from a camera 4a. Furthermore, the computer sends the direction to control equipment 90 to vary the position of the rotation center 41a of a reflecting mirror 41, based on the values calculated above. In addition, in such a case that rotation speed of a reflecting mirror 41 is slow and trajectory 200A can visually be confirmed, a camera to shoot the surface of a work 200 such as shown in laser welding equipment shown in FIG. 8, may not be installed. In this case, angle θ, and minor axis length L2 and major axis length L3 of trajectory 200A shown in FIG. 6 are visually measured. Then, based on the values measured, processing to vary the position of a scanner head 4 is directed to control equipment 90, so that angle θ becomes specified angle, as well as minor axis length L2 and major axis length L3 become the same and specified length.

In addition, in the embodiment, such a case is described that an irradiation direction of laser light 100 is controlled so that an irradiation pattern of laser light 100 draws a circle at the surface of a work 200, however, the present invention is also applicable to a case that an irradiation direction of laser light 100 varies in an aspect different from the above embodiment, by means of obtaining figure data corresponding to angle θ, or minor axis length L2 and major axis length L3 shown in FIG. 5.

The present invention is based on Japanese Patent Application No. 2005-289180 filed on Sep. 30, 2005, in which the entire disclosure is incorporated herein by reference in its entirety.

The invention claimed is:

1. A method for displaying laser irradiation state, wherein laser light is irradiated at a surface of a work in a specified pattern shape of an ellipse by a laser irradiation part mounted at a robot hand through rotation of a reflecting mirror, the laser irradiation state irradiated at the work being displayed, in advance of process by irradiation of laser light at the work by the laser irradiation part, and:

calculating the length between the rotation center of the reflecting mirror and the center of the ellipse at the irradiation position of the laser light at the surface of the work; and obtaining coordinate data of the rotation center of the reflecting mirror and of the irradiation position of the laser light at the surface of the work.

2. The method for displaying laser irradiation state of claim 1, wherein the specified pattern shape to be irradiated is formed by operation of the reflecting mirror of the laser irradiation part.

3. The method for displaying laser irradiation state of claim 1, further having a step for obtaining image data based on a trajectory of the pattern to be irradiated, by an image shooting part, and further having a step for calculating an irradiation angle of laser light at the work and for also calculating a separated distance between the laser irradiation part and the irradiation position of laser light at the surface of the work, based on data obtained in the step for obtaining image data based on a trajectory of the pattern to be irradiated.

4. The method for displaying laser irradiation state of claim 1, wherein the irradiation of laser light is carried out by decreasing output power of laser light so as to be projected in non-welding state to the work.

5. The method for displaying laser irradiation state of claim 4, wherein the irradiation of the laser light is carried out by adjusting output power of laser light depending on the kind of the work.

6. An apparatus of displaying laser irradiation state, wherein laser light is irradiated by a laser irradiation part which is mounted at a robot hand through rotation of a reflecting mirror and set a movement so that laser light is irradiated at a surface of a work in a specified pattern shape of an ellipse and then the laser irradiation state irradiated at the work being displayed, in advance of process by irradiation of laser light at the work by the laser irradiation part, and, having a controller, wherein the controller:

calculates the irradiation angle of laser light to the work;

calculates the length between the rotation center of the reflecting mirror and the ellipse center at the irradiation position of the laser light at the surface of the work; and obtains coordinate data of the rotation center of the reflecting mirror and of the irradiation position of the laser light at the surface of the work.

7. The apparatus of displaying laser irradiation state of claim 6, wherein the specified pattern to be irradiated is formed by movement of the reflecting mirror of the laser irradiation part.

* * * * *